(12) United States Patent
Kubo et al.

(10) Patent No.: US 6,183,667 B1
(45) Date of Patent: Feb. 6, 2001

(54) TITANIUM-AND COPPER-CONTAINING CARBON COMPOSITE MATERIAL AND PROCESS FOR THE PRODUCTION THEREOF

(75) Inventors: Shunichi Kubo, Kokubunji; Jitsuji Ikeuchi, Tachikawa; Hiroshi Tsuchiya, Kokubunji; Yoshitaka Tomiyama, Kyoto; Kojiro Saito, Kyoto; Yoshinobu Morita, Kyoto; Takao Nakagawa; Yoshio Yoshihara, both of Warabi, all of (JP)

(73) Assignees: Railway Technical Research Institute; Japan Powder Metallurgy Co., Ltd.; Across Co., Ltd., all of (JP)

( * ) Notice: Under 35 U.S.C. 154(b), the term of this patent shall be extended for 0 days.

(21) Appl. No.: 09/537,661

(22) Filed: Mar. 29, 2000

(30) Foreign Application Priority Data

Mar. 30, 1999 (JP) .................................................. 11-088329

(51) Int. Cl.$^7$ ............................... H01B 1/04; H01B 5/00; B32B 3/00
(52) U.S. Cl. ........................ 252/503; 428/312.8; 33/23.01
(58) Field of Search .................................... 252/502, 503, 252/506; 428/312.8, 924; 420/492; 33/23.01

(56) References Cited

U.S. PATENT DOCUMENTS

| | | | |
|---|---|---|---|
| 3,869,259 | * | 3/1975 | Lindsey ................................ 29/182.8 |
| 4,772,502 | * | 9/1988 | Okura et al. ............................ 428/74 |
| 5,206,085 | * | 4/1993 | Nakagawa et al. .................. 428/372 |
| 6,059,847 | * | 5/2000 | Farahmandi et al. ............... 29/25.03 |

FOREIGN PATENT DOCUMENTS

01270512 * 10/1989 (JP) .
01270571 * 10/1989 (JP) .

* cited by examiner

Primary Examiner—Mark Kopec
(74) Attorney, Agent, or Firm—Lorusso & Loud

(57) ABSTRACT

A composite material having a carbon matrix, and a titanium-copper alloy dispersed in the carbon matrix and containing 1–80% by weight of titanium and 15.4–99% by weight of copper. The titanium-copper alloy is present in an amount of 2–85% based on a total weight of the carbon matrix and the titanium-copper alloy. The composite material may additionally contain carbon fibers dispersed in the carbon matrix. The composite material is produced by incorporating powder or melt of titanium and copper or copper alloy into a shaped body of carbon.

24 Claims, 1 Drawing Sheet

TITANIUM-AND COPPER-CONTAINING CARBON COMPOSITE MATERIAL AND PROCESS FOR THE PRODUCTION THEREOF

This invention relates to a titanium- and copper-containing carbon composite material and to a process for the production thereof.

A current collection installation mounted on a locomotive roof for supplying electric current to the locomotive on a track from an overhead conductor extending along the track is called pantograph. FIG. 1 schematically depicts such a pantograph generally designated as 500. The pantograph 500 has a base 506 secured to insulators 507 on a locomotive roof (not shown) for supporting a frame 509 thereon. The frame 509 has a lower pantograph arm 501 pivoted obliquely upward about a horizonal shaft 508 rotatably received in bearings and an upper pantograph arm 502 pivoted obliquely downward about a shaft (not shown) received in bearings. The upper and lower arms 501 and 502 are pivotally connected to each other. Secured to an apex portion of the upper arm 501 are bows 503 to which sliding plates 504 are fixed by, for example, screws. Designated as 505 is a spring operatively connected to the shaft 508 for urging the shaft 508 to rotate in a direction so that the sliding plates 504 on the bows 503 are maintained in contact with an overhead conductor (not shown) generally made of hard-drawn copper. Thus, the pantograph 500 collects electric power from the overhead conductor by sliding contact of the sliding plates 504 therewith.

Such a sliding plate 504 is required to be made of a material having the following characteristics:

(1) good electrical conductivity;
(2) low frictional resistance;
(3) high wearing resistance;
(4) small tendency to cause wearing of overhead conductor;
(5) high toughness;
(6) high resistance to arc.

With a view toward obtaining a sliding plate which meets with the above criteria, JP-A-H7-126713 proposes a sliding plate made of a shaped body of a carbon fiber-reinforced carbon composite (C/C composite) in which copper is impregnated. The production of the Cu-containing C/C composite body is carried out in an impregnation furnace maintained under a pressure of 2 torr by immersing a carbon shaped body in a melt of oxygen-free copper at 1,150° C. or more while applying a pressure of 130 atm thereto. This process must use a large apparatus and a long process time and, therefore, has a problem that the productivity is low and production costs are high. The Cu-containing C/C composite body has an additional problem because the mechanical strengths such as toughness is unsatisfactory. Thus, a sliding plate made of the Cu-containing C/C composite is apt to be broken when the thickness thereof is reduced during use.

SUMMARY OF THE INVENTION

It is, therefore, the prime object of the present invention to provide a composite material which meets with the above-described requirements and which is suitable for use as a sliding plate for a pantograph.

Another object of the present invention is to provide a composite material which is devoid of the drawbacks of the conventional technique.

It is a further object of the present invention to provide a composite material which has good electrical conductivity, low frictional resistance and high mechanical strengths, which is light in weight and which can be produced by a simple process.

It is yet a further object of the present invention to provide an economical process for producing a composite material.

In accomplishing the foregoing objects, there is provided in accordance with the present invention a composite material comprising:

a carbon matrix, and a titanium-copper alloy dispersed in said carbon matrix and containing 1–80% by weight of titanium and 14–99% by weight of copper, said titanium-copper alloy being present in an amount of 2–85% based on a total weight of said carbon matrix and said titanium-copper alloy.

In another aspect, the present invention provides a process for the preparation of a composite material, comprising the steps of:

(a) forming a shaped body of a carbon; and
(b) impregnating said shaped body with a melt of titanium and with a melt of copper or a copper alloy.

The present invention also provides a process for the preparation of a composite material, comprising the steps of:

(a) forming a shaped body of a carbon in which metal components including titanium and copper are dispersed, and
(b) heating said shaped body at a temperature sufficient to melt said metal components.

The present invention further provides a process for the preparation of a composite material, comprising the steps of:

(a) forming a shaped body of a carbon in which titanium is dispersed, and
(b) impregnating said shaped body with a melt of copper or a copper alloy.

The present invention further provides a process for the preparation of a composite material, comprising the steps of:

(a) providing a preformed yarn comprising a core of a multiplicity of carbon fibers, fine powders of carbon and titanium provided in interstices between said fibers, and a flexible sleeve of a thermoplastic resin surrounding said core;
(b) forming said yarn into a shaped body;
(c) incorporating copper or a copper alloy into said shaped body; and
(d) heating said shaped body so that said titanium forms an alloy with said copper or said copper alloy.

The present invention further provides a pantograph for collecting electric current from a conductor and supplying the electric current to a vehicle, comprising a frame secured to the vehicle, and a contact member supported by a frame for sliding contact with the conductor, said contact member being formed of the above composite material.

It has been found poor wettability of carbon with a melt of copper is ascribed to the difficulty in impregnating the C/C composite with copper and unsatisfactory toughness of the Cu-containing C/C composite in the above-described known technique. More particularly, carbon is not wetted with but repels a melted copper. Thus, when a melted copper is impregnated into voids, pores or interstices of a shaped carbon body, the melted copper does not coat the carbon walls but forms droplets or spheres therein. Upon solidification by cooling, the copper particles are not tightly bound by or bonded to the carbon walls but are present in a free state. Moreover, the copper is not uniformly distributed in the carbon shaped body. Therefore, it is necessary to apply a high pressure of more than 100 atm in order to uniformly impregnate the carbon body with melted copper. The Cu-containing C/C composite thus obtained by forcibly impregnating the carbon body with melted copper is still low in mechanical strengths.

When copper is used in conjunction with titanium, on the other hand, wettability of carbon with copper is much improved. As a result, a carbon shaped body is easily impregnated with melted copper uniformly. The melted copper and titanium form an alloy and are tightly bound to carbon walls, so that the Ti- and Cu-containing C/C composite material has excellent physical properties such as high mechanical strengths.

The term "wettability" herein may be expressed in terms of contact angle between a liquid and a solid. When the contact angle is acute, the wettability is good and the solid (carbon) is well wetted with the liquid (melted copper and titanium). The liquid contacts well with the solid surface and is widely spread thereon. On the other hand, when the contact angle is obtuse, the wettability is not good.

BRIEF DESCRIPTION OF THE DRAWINGS

Other objects, features and advantages of the present invention will become apparent from the detailed description of the preferred embodiments of the invention which follows, when considered in the light of the accompanying drawings, in which.

DETAILED DESCRIPTION OF THE PREFERRED EMBODIMENTS OF THE INVENTION

Figure 1:
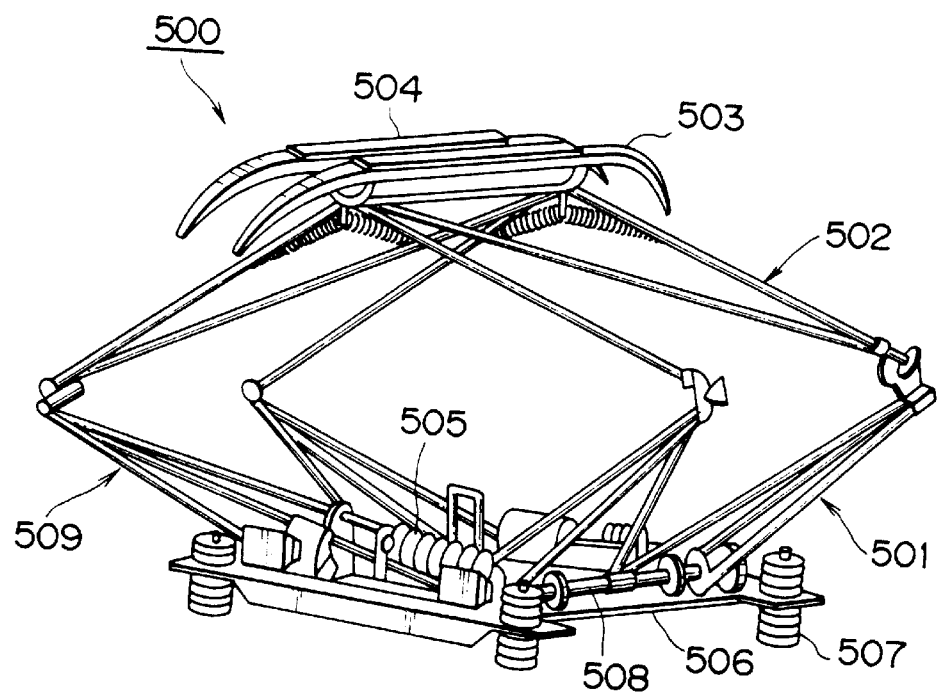
FIG. 1 is a perspective view diagramattically illustrating a pantograph for a locomotive.

The composite material according to the present invention may be a shaped body of any desired shape. The shaped body is formed of carbon and is impregnated with a titanium-copper alloy containing 1–80% by weight, preferably 5–60% by weight, most preferably 10–40% by weight, of titanium; and 14–99% by weight, preferably 30.8–95% by weight, most preferably 46.1–90% by weight of copper. The titanium-copper alloy being present in an amount of 2–85%, preferably 5–70%, most preferably 10–60%, based on a total weight of the carbon matrix and the titanium-copper alloy.

It is preferred that the carbon shaped body be a C/C composite containing a multiplicity of carbon fibers dispersed therein (carbon fiber-reinforced carbon composite). The carbon fibers may orient uniaxially, biaxially or at random. The length of the carbon fibers is preferably at least 5 mm. Any carbon fiber may be used for the purpose of the present invention. Typical example of carbon fiber used in the present invention is obtained from a precursor such as PAN (polyacrylonitrile), coal tar pitch or petroleum pitch by a method including a stabilizing step in which crosslinking is carried out by oxidation with air, a carbonization step, and a graphatizing step. Glassy carbon fibers obtained by a method including spinning a thermosetting resin into fibers, curing the spun fibers and carbonizing the cured fibers may also be used. Further, vapor phase grown carbon fibers obtained by growing carbon fibers by vapor phase deposition of carbon may also be used for the purpose of the present invention.

The titanium-copper alloy may contain at least one additional element other than titanium and copper and selected from Group 2 typical metal elements (e.g. Be, Mg, Ca, Sr and Ba), Group 4 transition metal elements (e.g. Zr and Hf), Group 5 transition metal elements (e.g. V, Nb and Ta), Group 6 transition metal elements (e.g. Cr, Mo and W), Group 7 transition metal elements (e.g. Mn), Group 8 transition metal elements (e.g. Fe), Group 9 transition metal elements (e.g. Co, Rh and Ir), Group 10 transition metal elements (Ni and Pd), Group 11 transition metal elements (e.g. Ag), Group 12 transition metal elements (e.g. Zn and Cd), Group 13 elements (e.g. B, Al, Ga and In), Group 14 elements (e.g. Si, Ge, Sn and Pb) and Group 15 elements (P, As, Sb and Bi). The additional element may be present in an amount of not more than 30% based on the weight of the copper.

The composite material may be obtained by various methods.

In a first method, a shaped body of a carbon is impregnated with a melt of titanium and with a melt of copper or a copper alloy. Impregnation of a melt of copper may be preceded by or simultaneous with impregnation of a melt of titanium. The melt of titanium and the melt of copper may be a melt of a titanium-copper alloy. The copper alloy described herein and hereinafter is an alloy of copper with at least one additional element described previously and inclusive of titanium. The amount of the additional element is not more than 30% based on the weight of copper. The carbon shaped body may be calcined and, if desired, graphatized before or after the impregnation. The carbon shaped body is preferably a carbon fiber-reinforced carbon composite.

In a second method, a shaped body of a carbon in which metal components including titanium and copper are dispersed is heated at a temperature sufficient to melt the metal components. The metal components may be a mixture of titanium powder with copper powder or copper alloy powder. Alternatively, titanium powder and copper or copper alloy powder may be separately incorporated into the shaped body. The shaped body preferably contains carbon fibers dispersed therein. The shaped body may be obtained by press molding at 150–900° C. under a pressure of ambient pressure to 300 kgf/cm$^2$. The heating of the carbon shaped body to melt the metal components may be effected by calcination of the shaped body. If desired, the calcination is followed by graphatization.

In a third method, a shaped body of a carbon in which titanium is dispersed is impregnated with a melt of copper or a copper alloy. The carbon shaped body may be calcined and, if desired, graphatized before or after the impregnation. The shaped body may be a carbon fiber-reinforced carbon composite.

In the foregoing processes, the C/C composite may be produced by (i) a CVD method wherein a hydrocarbon gas is fed to a furnace in which a carbon fiber preform is placed and heated at a high temperature, thereby to pyrolyze and carbonize the hydrocarbon gas and to permit the thus produced carbon to deposit on the carbon fiber preform, (ii) a method wherein carbon fibers impregnated with a thermosetting resin such as a phenol resin or an epoxy resin is molded into a desired shape and the molding is then calcined in an inert gas to carbonize the resin, and (iii) a method wherein a preformed yarn is formed into a desired shape by hot pressing or filament winding and the shaped body is then calcined.

Described next is a process for the production of the Ti- and Cu-containing C/C composite material using a preformed yarn. This process includes the steps of:

(a) providing a preformed yarn comprising a core of a multiplicity of carbon fibers, fine powders of carbon and titanium provided in interstices between the fibers, and a flexible sleeve of a thermoplastic resin surrounding the core;

(b) forming the yarn into a shaped body;

(c) incorporating copper or a copper alloy into the shaped body; and (d) heating the shaped body so that the titanium forms an alloy with the copper or the copper alloy.

Structure and method of producing a preformed yarn used in step (a) are described in U.S. Pat. Nos. 4,772,502 and 5,206,085, the teachings of which inclusive of the specification, claims and drawings, are hereby incorporated by reference herein.

Step (c) uses a powder or a melt of copper or copper alloy and may be performed during step (b), between steps (c) and (d) or during step (d).

Step (b) may include (b1) weaving the yarn into fabrics, (b2) laminating the fabrics, (b3) pressing the laminated fabrics at 150–900° C. under a pressure of ambient pressure to 300 kgf/cm$^2$ to form the shaped body. In this case, step (c) may be performed during step (b2), between steps (b2) and (b3) or after step (b3).

In another embodiment, step (b) comprises (b1) cutting the yarn, and (b2) pressing the cut yarn at 150–900° C. under a pressure of ambient pressure to 300 kgf/cm$^2$ to form the shaped body. In this case, step (c) may be performed between steps (b1) and (b2) or after step (b2).

Step (d) is performed so that the shaped body is calcined and, if desired, graphatized. Calcination is generally performed at 700–1,300° C., while graphatization is generally performed at 1,300–3,000° C.

The Ti- and Cu-containing carbon composite material according to the present invention may be suitably used as a sliding plate of a pantograph of electric locomotive in which current collection is from overhead conductor as shown in FIG. 1. However, the composite material of the present invention may be also used as a sliding member for a current collection system in which a third rail (conductor) is installed in addition to a pair of rails on which a vehicle runs and in which the contact member is in sliding contact with the third rail to collect electrical current therefrom. Further, it is without saying that the composite material can be utilized as various parts, such as bearings, of machines which are subjected to wearing conditions.

The following examples will further illustrate the present invention.

EXAMPLE 1

Preparation of Preformed Yarn

A preformed yarn composed of a core of a multiplicity of carbon fibers, fine powders of carbon and titanium provided in interstices between the fibers, and a flexible sleeve of a thermoplastic resin and surrounding the core was produced. The carbon fibers are produced from an acrylonitrile copolymer and in the form of a bandle of 12,000 carbon fiber filaments having a density of 1.76 g/cm$^3$, a tensile strength of 360 kgf/mm$^2$, a tensile modulus of 23.5×10$^3$ kgf/mm$^2$ and a ductility of 1.5%. As the carbon powder, a mixture of a coal-derived bulk mesophase pitch and pitch coke was used. The mesophase pitch had a softening point of 280° C., a volatile matter content of 18.0% by weight and an average particle diameter of 15 μm. The pitch coke had no softening point, a volatile matter content of 8.0% by weight and an average particle diameter of 10 μm. Titanium powder had a purity of more than 99.1% and a particle diameter of 500 μm or less. The flexible sheet was made of polypropylene having a density of 0.9 g/cm$^3$, a bending strength of 9.5 kgf/mm$^2$ and a bending modulus of 100 kgf/mm$^2$. The carbon fiber bundle was passed through a fluidized mass of the carbon and titanium powders and then covered with the polypropylene resin, thereby obtaining the preformed yarn having an outer diameter of 1.8 mm and a Ti content of 9.0% by weight.

Preparation of Sheet

Figure 2:
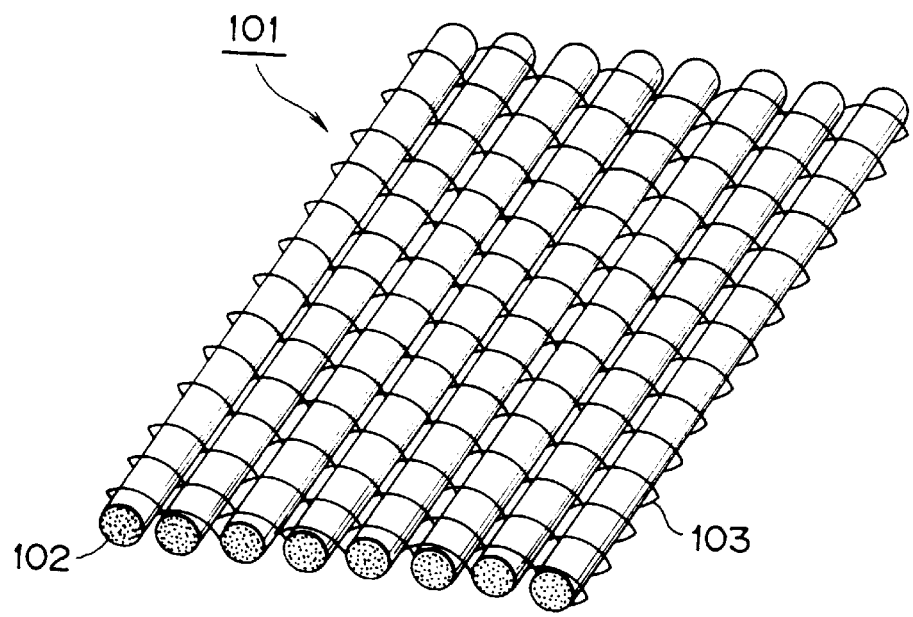
FIG. 2 is a perspective view schematically illustrating a woven sheet composed of a warp of a thermoplastic resin and a weft of a preformed yarn.

The thus obtained preformed yarn was woven into a plain weave sheet as shown in FIG. 2. Designated generally as 101 is a sheet composed of unidirectionally oriented wefts 102 of the above-described preformed yarn and warps 103 of a thermoplastic resin. The thermoplastic resin warp 103 was a polypropylene thread having a filament number of 1 and a deniel number of 180 de (diameter: about 140 μm). Using a rapier loom, the weft and warp were woven while applying a tension of 12 gf to the warp 103 and a tention of 450 gf to the weft 102, thereby to obtain the sheet 101. The sheet 101 had a volume ratio of carbon fibers:polypropylene resin (a total of the flexible sleeve and the warp 103):carbon powder of 45:5:50.

Preparation of Composite Material

Using a plurality of sheets 101 obtained above a composite material was prepared. Thus, a mixture of copper alloy powder with a phenol resin was applied on each of the sheets 101. The copper alloy was composed of 96.0% of copper (Cu), 3.0% of aluminum (Al) and 1.0% of phosphorus (P). The phenol resin was commercially available as Phenolite J-325 from Dainippon Ink Chemical Industry Ltd. The coated sheets were superposed one over the other such that the orientation of the carbon fibers thereof was alternately changed at an angle of 90°. The laminate thus obtained was then maintained for 20 minutes under press molding conditions involving a temperature of 600° C. and a pressure of 100 kgf/cm$^2$ to obtain a shaped body. The shaped body was then heated in the atmosphere of nitrogen to 1,300° C. and maintained at that temperature for 60 minutes (calcination treatment) to obtain a Ti- and Cu-containing composite material having a size of 100 mm×300 mm×30 mm. The composite material was a C/C composite in which an alloy containing Ti and Cu was dispersed, in which the carbon fibers were oriented biaxially and which had a carbon fiber content of 45.0% by volume, a carbon content of 52.4% by weight, a Ti content of 5.6% by weight and a Cu content (inclusive of Al and P) of 42% by weight. The volume ratio of Ti to other metals was 19.4:80.6.

EXAMPLE 2

A plurality of the sheets 101, obtained in the same manner as described in Example 1 except that the preformed yarn had a Ti content of 9.4% by weight, were superposed one over the other such that the orientation of the carbon fibers thereof was alternately changed at an angle of 90° C. The laminate thus obtained was then maintained for 20 minutes under press molding conditions involving a temperature of 600° C. and a pressure of 100 kgf/cm$^2$ to obtain a shaped body. The shaped body was then heated in the atmosphere of nitrogen to 1,200° C. and maintained at that temperature for 60 minutes (calcination treatment) to obtain a Ti-containing composite material. This was then overlaid with a layer of a copper alloy composed of 94.5% by weight of copper (Cu), 3.0% by weight of tin (Sn), 1.0% by weight of zinc (Zn), 0.5% by weight of phosphorus (P) and 1.0% by weight of cobalt (Co) and heated in a reducing gas atmosphere to 1,000° C. and maintained at that temperature for 60 minutes. As a consequence, the copper alloy was melted and penetrated into the composite material to obtain a Ti- and Cu-containing composite material having a size of 100 mm×300 mm×28 mm. The composite material was a C/C composite in which an alloy containing Ti and Cu was dispersed and had a carbon fiber content of 45.0% by volume, a carbon content of 60.8% by weight, a Ti content of 6.8% by weight and a Cu content (inclusive of Sn, Zn, Co and P) of 32.4% by weight. The volume ratio of Ti to other metals was 28.6:71.4.

EXAMPLE 3

The preformed yarn, obtained in the same manner as described in Example 1 except that the preformed yarn had a Ti content of 15.4% by weight, was cut into a length of 15 mm and mixed with copper alloy powder and a phenol resin as used in Example 1. The mixture was charged into a mold cavity of a hot press and then maintained for 20 minutes under press molding conditions involving a temperature of 600° C. and a pressure of 100 kgf/cm$^2$ to obtain a shaped body. The copper alloy used was composed of 86% of copper (Cu), 7.0% by weight of antimony (Sb), 2.0% by weight of beryllium (Be), 1.0% by weight of vanadium and 4.0% by weight of molybdenum (Mo). The 15 shaped body was then heated in the atmosphere of nitrogen to 1,300° C. and maintained at that temperature for 60 minutes (calcination treatment) to obtain a Ti- and Cu-containing composite material having a size of 100 mm×300 mm×28 mm. The composite material was an isotropic C/C composite in which an alloy containing Ti and Cu was dispersed, in which the carbon fibers were oriented at random and which had a carbon fiber content of 40.0% by volume, a carbon content of 54.3% by weight, a Ti content of 10.8% by weight and a Cu content (inclusive of Sb, Be, V and Mo) of 34.9% by weight. The volume ratio of Ti to other metals was 35.34:64.7.

EXAMPLE 4

The preformed yarn, obtained in the same manner as described in Example 1 except that the preformed yarn had a Ti content of 26.2% by weight, was cut into a length of 15 mm and charged into a mold cavity of a hot press and maintained for 20 minutes under press molding conditions involving a temperature of 600° C. and a pressure of 100 kgf/cm$^2$ to obtain a shaped body. The shaped body was then heated in the atmosphere of nitrogen to 1,200° C. and maintained at that temperature for 60 minutes (calcination treatment) to obtain a Ti-containing composite. This was then overlaid with a layer of a copper alloy composed of 93.0% by weight of copper (Cu), 2.0% by weight of zinc (Zn) and 5.0% by weight of bismuth (Bi) and heated in a hydrogen gas atmosphere to 1,000° C. and maintained at that temperature for 60 minutes. As a consequence, the copper alloy was melted and penetrated into the composite material to obtain a Ti- and Cu-containing composite material having a size of 100 mm×300 mm×28 mm. The composite material was an isotropic C/C composite in which an alloy containing Ti and Cu was dispersed, in which the carbon fibers were oriented at random and which had a carbon fiber content of 40.0% by volume, a carbon content of 54.5% by weight, a Ti content of 21.2% by weight and a Cu content (inclusive of Zn and Bi) of 24.3% by weight. The volume ratio of Ti to other metals was 63.4:36.6.

EXAMPLE 5

Carbon fiber woven fabrics impregnated with a phenol resin (as used in Example 1) were laminated. The laminate was maintained for 90 minutes under press molding conditions involving a temperature of 180° C. and a pressure of 20 kgf/cm$^2$ to obtain a shaped body. The shaped body was then heated in the atmosphere of nitrogen to 1,300° C. and maintained at that temperature for 60 minutes (calcination treatment). This was impregnated with a pitch and calcined at 1300° C. The impregnation and calcination procedures were repeated several times to obtain a C/C composite in which carbon fibers are biaxially oriented in a matrix of carbon. The C/C composite was then charged in a metal vessel containing powders of titanium (as used in Example 1) and a copper alloy composed of 94.1% by weight of copper (Cu), 4.0% by weight of aluminum (Al) and 2.0% by weight of nickel (Ni). The C/C composite in the vessel was heated at 1,200° C. in a reducing atmosphere, so that the titanium and copper alloy were melted and penetrated into the C/C composite to obtain a Ti- and Cu-containing composite material having a size of 100 mm×300 mm×28 mm. The composite material was a C/C composite in which an alloy containing Ti and Cu was dispersed, in which the carbon fibers were biaxially oriented and which had a carbon fiber content of 45.0% by volume, a carbon content of 49.0% by weight, a Ti content of 31.4% by weight and a Cu content (inclusive of Zn and Bi) of 19.6% by weight. The volume ratio of Ti to other metals was 70.2:29.8.

COMPARATIVE EXAMPLE 1

A vessel containing sintered carbon powder was placed in an oven maintained under a vacuum of 2 torr. The carbon powder was then impregnated with a melt of copper at 1,150° C. and pressed molded at 130 atm to obtain a Cu-containing carbon composite material having a size of 100 mm×300 mm×30 mm.

COMPARATIVE EXAMPLE 2

A preformed yarn composed of a core of a multiplicity of carbon fibers, fine powders of carbon provided in interstices between the fibers, and a flexible sleeve of a thermoplastic resin and surrounding the core was produced in the same manner as that for the production of the preformed yarn described in Example 1 except that no titanium powder was used. The thus obtained preformed yarn was woven into a plain weave sheet in the same manner as described in Example 1. A mixture of copper alloy powder with a phenol resin as used in Example 1 was applied on the sheet. A plurality of such coated sheets were superposed one over the other such that the orientation of the carbon fibers thereof was alternately changed at an angle of 90°. The laminate thus obtained was then maintained for 20 minutes under press molding conditions involving a temperature of 600° C. and a pressure of 100 kgf/cm$^2$ to obtain a shaped body. The shaped body was then heated in the atmosphere of nitrogen to 1,300° C. and maintained at that temperature for 60 minutes (calcination treatment) to obtain a Cu-containing C/C composite material having a size of 100 mm×300 mm×30 mm.

COMPARATIVE EXAMPLE 3

The preformed yarn obtained in Example 2 was woven into a plain weave sheet in the same manner as described in Example 1. A plurality of such coated sheets were superposed one over the other such that the orientation of the carbon fibers thereof was alternately changed at an angle of 90°. The laminate thus obtained was then maintained for 20 minutes under press molding conditions involving a temperature of 600° C. and a pressure of 100 kgf/cm² to obtain a shaped body. The shaped body was then heated in the atmosphere of nitrogen to 1,200° C. and maintained at that temperature for 60 minutes (calcination treatment) to obtain a C/C composite and in which the carbon fibers were biaxially oriented in a matrix of carbon. This was then overlaid with a layer of the same copper alloy as used in Example 2 and heated in a reducing gas atmosphere to 1,000° C. and maintained at that temperature for 60 minutes. However, the melt of the copper alloy did not penetrate into the composite. Thus, a Cu-containing C/C composite material was unable to be produced.

COMPARATIVE EXAMPLE 4

The preformed yarn obtained in Comparative Example 2 was cut into a length of 15 mm and mixed with copper alloy powder having the same composition as that used in Example 3. The mixture was charged into a mold cavity of a hot press and then maintained for 20 minutes under press molding conditions involving a temperature of 600° C. and a pressure of 100 kgf/cm² to obtain a shaped body. The shaped body was then heated in the atmosphere of nitrogen to 1,300° C. and maintained at that temperature for 60 minutes (calcination treatment) to obtain a Cu-containing C/C composite material having a size of 100 mm×300 mm×28 mm and a carbon fiber content of 40.0% by volume.

COMPARATIVE EXAMPLE 5

The preformed yarn obtained in Comparative Example 2 was cut into a length of 15 mm and charged into a mold cavity of a hot press and maintained for 20 minutes under press molding conditions involving a temperature of 600° C. and a pressure of 100 kgf/cm² to obtain a shaped body. The shaped body was then heated in the atmosphere of nitrogen to 1,200° C. and maintained at that temperature for 60 minutes (calcination treatment) to obtain a C/C composite. This was then overlaid with a layer of a copper alloy having the same composition as that of Example 4 and heated in a reducing gas atmosphere to 1,000° C. and maintained at that temperature for 60 minutes. However, the melt of the copper alloy failed to penetrate into the composite material. Thus, a Cu-containing C/C composite material was unable to be produced.

Each of the composite materials obtained in Examples 1–5 and Comparative Examples 1, 2 and 4 was tested for mechanical strengths, specific resistance and wear resistance according to the following methods.

Mechanical Strengths

Each composite material is cut to obtain 10 test samples each having a size of 10 mm×10 mm×55 mm. A half of them are subjected to bending strength test, while the other half are subjected to Charpy impact test. The results are summarized in Table 1. The values indicated in Table 1 are averages of the five samples.

Specific Resistance

Each composite material is cut to obtain 10 test samples each having a size of 10 mm×10 mm×55 mm. The sample is measured for specific resistance. The results are summarized in Table 1. The values indicated in Table 1 are averages of the ten samples.

Wear Resistance

Each composite material is cut to obtain 5 test samples each having a size of 10 mm×25 mm×25 mm.

An annular ring made of hard-drawn copper (JIS C1100 BB-H) having an outer diameter of 83 cm, a width of 6 mm and a thickness of 5 mm is attached to an outer periphery of a rotating disc, secured to a drive shaft of a motor, for rotation therewith. The ring is electrically connected to an electric current source. The copper ring is rotated at a circumferential speed of 100 km/hour. While applying an electrical current of 200 A to the ring, test sample is pressed in a face-to-face fashion against the ring at a pressing force of 5 kgf and maintained in pressure and sliding contact with the rotating ring for 1 minute. Such a contacting operation is repeated 4 times in total. A specific wear is calculated as follows:

$$SW = V/(F \cdot L)$$

where

SW represents a specific wear [mm³/kgf·mm],

V represents a decrease in volume as a result of the test [mm³] (determined by (W1−W2)/D where W1 and W2 represent the weight of the sample before and after the test, respectively, and D is a density of the sample)

F represents a pressing force [kgf],

L represents a distance through which the test sample travels for sliding contact with the ring [mm].

Further, the sample after the test is observed to check whether or not there occurs crack or breakage thereof. The results are summarized in Table 1. The values indicated in Table 1 are averages of the ten samples.

TABLE 1

| Example No. | Bending Strength (kgf/cm²) | Charpy Impact Value (kgf·cm/cm²) | Specific Resistance ($10^{-6} \times \mu \cdot \Omega \cdot cm$) | Specific Wear ($10^{-7} \times mm^3/kgf \cdot mm$) | Crack or Breakage |
|---|---|---|---|---|---|
| 1 | 2150 | 10.80 | 80 | 4.3 | no |
| 2 | 2691 | 10.78 | 95 | 4.5 | no |
| 3 | 1550 | 8.65 | 100 | 4.8 | no |
| 4 | 1600 | 8.35 | 145 | 4.0 | no |
| 5 | 2050 | 10.50 | 180 | 3.9 | no |
| Comp. 1 | 1100 | 5.30 | 270 | 6.0 | occur |
| Comp. 2 | 1150 | 8.05 | 450 | 6.5 | no |
| Comp. 4 | 850 | 7.50 | 580 | 6.5 | no |

A sliding plate for use in pantographs must have a bending strength of at least about 1,000 kgf/cm², a Charpy impact resistance of at lest about 3.5 kgf·cm/cm², and a specific resistance of not greater than 300×10⁻⁶ μ·Ω·cm. The Ti- and Cu-containing C/C composite material according to the present invention fully meets with these requirements.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

The teachings of Japanese Patent Application No. H11-088329, filed Mar. 30, 1999, inclusive of the specification, claims and drawings, are hereby incorporated by reference herein.

What is claimed is:

1. A composite material comprising
   a carbon matrix, and
   a titanium-copper alloy dispersed in said carbon matrix and containing 1–80% by weight of titanium and 15.4–99% by weight of copper,
   said titanium-copper alloy being present in an amount of 2–85% based on a total weight of said carbon matrix and said titanium-copper alloy.

2. A composite material as claimed in claim 1, further comprising carbon fibers dispersed in said carbon matrix.

3. A composite material as claimed in claim 2, wherein said carbon fibers orient uniaxially.

4. A composite material as claimed in claim 2, wherein said carbon fibers orient biaxially.

5. A composite material as claimed in claim 2, wherein said carbon fibers orient at random.

6. A composite material as claimed in claim 2, wherein said carbon fibers have a length of at least 5 mm.

7. A composite material as claimed in claim 1, wherein said titanium-copper alloy is present in an amount of 5–70% based on a total weight of said carbon matrix and said titanium-copper alloy.

8. A composite material as claimed in claim 1, wherein said titanium-copper alloy contains 5–60% by weight of titanium and 30.8–95% by weight of copper.

9. A composite material as claimed in claim 1, wherein said titanium-copper alloy contains at least one additional element other than titanium and copper and selected from the group consisting of Group 2 typical metal elements, Group 4 transition metal elements, Group 5 transition metal elements, Group 6 transition metal elements, Group 7 transition metal elements, Group 8 transition metal elements, Group 9 transition metal elements, Group 10 transition metal elements, Group 11 transition metal elements, Group 12 transition metal elements, Group 13 elements, Group 14 elements and Group 15 elements, said additional element being present in an amount of not more than 30% based on the weight of said copper.

10. A process for the preparation of a composite material of claim 1, comprising the steps of:
    (a) forming a shaped body of a carbon; and
    (b) impregnating said shaped body with a melt of titanium and with a melt of copper or a copper alloy.

11. A process as claimed in claim 10, wherein said shaped body is formed of a carbon fiber-reinforced carbon composite.

12. A process for the preparation of a composite material of claim 1, comprising the steps of:
    (a) forming a shaped body of a carbon in which metal components including titanium and copper are dispersed, and
    (b) heating said shaped body at a temperature sufficient to melt said metal components.

13. A process as claimed in claim 12, wherein said metal components further include at least one metal other than titanium and copper.

14. A process as claimed in claim 12, wherein said shaped body contains carbon fibers dispersed therein.

15. A process for the preparation of a composite material of claim 1, comprising the steps of:
    (a) forming a shaped body of a carbon in which titanium is dispersed, and
    (b) impregnating said shaped body with a melt of copper or a copper alloy.

16. A process as claimed in claim 15, wherein said shaped body is formed of a carbon fiber-reinforced carbon composite.

17. A process for the preparation of a composite material of claim 1, comprising the steps of:
    (a) providing a preformed yarn comprising a core of a multiplicity of carbon fibers, fine powders of carbon and titanium provided in interstices between said fibers, and a flexible sleeve of a thermoplastic resin surrounding said core;
    (b) forming said yarn into a shaped body;
    (c) incorporating copper or a copper alloy into said shaped body; and
    (d) heating said shaped body so that said titanium forms an alloy with said copper or said copper alloy.

18. A process as claimed in claim 17, wherein step (c) is performed during step (b), between steps (c) and (d) or during step (d).

19. A process as claimed in claim 17, wherein step (b) includes (b1) weaving said yarn into fabrics, (b2) laminating said fabrics, (b3) pressing said laminated fabrics at an elevated temperature to form said shaped body.

20. A process as claimed in claim 19, wherein step (c) is performed during step (b2), between steps (b2) and (b3) or after step (b3).

21. A process as claimed in claim 17, wherein step (b) comprises (b1) cutting said yarn, and (b2) pressing said cut yarn at an elevated temperature to form said shaped body.

22. A process as claimed in claim 21, wherein step (c) is performed between steps (b1) and (b2) or after step (b2).

23. A process as claimed in claim 17, wherein step (d) is performed so that said shaped body is graphatized.

24. A pantograph for collecting electric current from a conductor and supplying the electric current to a vehicle, comprising a frame secured to the vehicle, and a contact member supported by said frame for sliding contact with the conductor, said contact member being formed of a composite material according to claim 1.

* * * * *